United States Patent
Hikosaka et al.

(10) Patent No.: US 6,548,194 B2
(45) Date of Patent: Apr. 15, 2003

(54) PERPENDICULAR MAGNETIC RECORDING MEDIUM AND A MAGNETIC REPRODUCING APPARATUS

(75) Inventors: Takashi Hikosaka, Tokyo (JP); Futoshi Nakamura, Ichikawa (JP); Soichi Oikawa, Yokohama (JP); Hiroshi Sakai, Ichihara (JP); Kenji Shimizu, Chiba (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 36 days.

(21) Appl. No.: 09/917,840

(22) Filed: Jul. 31, 2001

(65) Prior Publication Data
US 2002/0177012 A1 Nov. 28, 2002

(30) Foreign Application Priority Data
Mar. 12, 2001 (JP) .......................... 2001-068736

(51) Int. Cl.⁷ .............................. G11B 5/66; G11B 5/70; G11B 5/012; B32F 15/00; H01F 1/12
(52) U.S. Cl. ................. 428/694 TM; 428/336; 428/611; 428/668; 428/679; 428/900; 360/97.01
(58) Field of Search .................... 428/694 TS, 694 TM, 428/336, 900, 611, 679, 668; 360/97.01

(56) References Cited

U.S. PATENT DOCUMENTS

| 4,544,491 A | 10/1985 | Uesaka et al. ............. 428/65.3 |
| 5,792,564 A | 8/1998 | Hikosaka et al. ........... 428/610 |
| 5,942,342 A | 8/1999 | Hikosaka et al. ....... 428/694 R |

FOREIGN PATENT DOCUMENTS

| JP | 2947029 | 5/1995 |
| JP | 7-105027 | 11/1995 |
| JP | 10-283624 | 10/1998 |

*Primary Examiner*—Holly C. Rickman
(74) *Attorney, Agent, or Firm*—Pillsbury Winthrop LLP

(57) ABSTRACT

Disclosed is a magnetic recording medium having a laminate structure comprising at least a substrate, a Co alloy bias layer, a soft magnetic layer, and a magnetic recording layer. The direction of residual magnetization of the Co alloy bias layer faces one direction of its radial direction. Also, the perpendicular magnetic recording medium satisfies the relationship given below:

$$Ms_{soft} \times (t_{soft} - 40\ nm) > Ms_{soft} \times 40\ nm + Ms_{bias} \times t_{bias}$$

where, $t_{bias}$ denotes the thickness of the cobalt alloy bias layer, $Ms_{bias}$ denotes the saturation magnetization of the cobalt alloy bias layer, $t_{soft}$ denotes the thickness of the soft magnetic layer, which falls within a range of between 40 nm and 200 nm, and $Ms_{soft}$ denotes the saturation magnetization of the soft magnetic layer.

8 Claims, 6 Drawing Sheets

PERPENDICULAR MAGNETIC RECORDING MEDIUM AND A MAGNETIC REPRODUCING APPARATUS

CROSS-REFERENCE TO RELATED APPLICATIONS

This application is based upon and claims the benefit of priority from the prior Japanese Patent Application No. 2001-068736, filed Mar. 12, 2001, the entire contents of which are incorporated herein by reference.

BACKGROUND OF THE INVENTION

The present invention relates to a magnetic recording medium used in, for example, a hard disc apparatus, particularly, to a perpendicular magnetic recording medium utilizing perpendicularly-oriented magnetization. The present invention also relates to a magnetic recording/reproducing apparatus utilizing perpendicularly-oriented magnetization.

Compared with a longitudinal magnetic recording layer, a perpendicular magnetic recording layer, which is capable of recording information in a linear direction at high density even if the recording layer is thick, exhibits a high resistance to thermal decay. Particularly, a double-layered perpendicular recording medium, in which a soft magnetic layer of high permeability is formed below the recording layer exhibiting a perpendicular magnetic anisotropy, permits ideal perpendicular recording because of the mutual function between the head and the soft magnetic layer and, thus, is indispensable for coping with the higher density recording in the future. However, it is known to the art that, if such a soft magnetic layer is formed in the recording medium, the magnetization of the soft magnetic layer is easily changed during rotation of the disc even if the external magnetic field is weak, leading to a lowering of the recorded signal and noise generation.

In order to improve the change in magnetization of the soft magnetic layer, it is proposed in, for example, Jpn. Pat. Appln KOKOKU Publication No. 03-53686 that an antiferromagnetic layer be formed on the soft magnetic layer. It is also proposed in Jpn. Pat. Appln KOKOKU Publication No. 7-105027 that a permanent magnet layer be formed below the soft magnetic layer. Also, it is taught that the direction of magnetization of the permanent magnet layer should be aligned in a radial direction. It is considered reasonable to understand that, if an anisotropy in the radial direction is imparted to the soft magnetic layer, formed is a mechanism for the magnetization rotation to bring about changes in the magnetization in the circumferential direction of the soft magnetic layer, leading to an improved high frequency response capability. JP '027 quoted above also discloses a laminate structure of a soft magnetic layer and a permanent magnet layer and teaches that it is possible to use an artificial lattice system such as CoFe/Cu as a bias layer for applying a bias instead of the antiferromagnetic materials layer.

However, such a bias layer is used on the premise that the geomagnetic field is weak. It is taught in Jpn. Pat. Appln KOKAI Publication No. 10-283624 that, in the actual apparatus in which the external magnetic field is increased to reach such a high value as thousands of A/cm, it is necessary to use a soft magnetic layer having a thickness of at least 600 nm in order to suppress reversal of a magnetization the bias layer.

As described above, in order to improve stability to an external magnetic field, and the output efficiency, it was considered advisable in the past to increase the thickness of the soft magnetic layer. If the thickness of the soft magnetic layer is increased, it is certainly possible to suppress the generation of domains in the intermediate circumferential region of the disc. However, since it is impossible to suppress the domain generation in regions where the intensity of the antimagnetic field is increased, such as the outer circumferential region and the region in the vicinity of the inner circumferential region of the disc, the domains are also formed in, for example, the data region, making it difficult to remove spike noise. Also, if the soft magnetic layer is thick, inverse domains are easily generated in the soft magnetic layer, leading to an increase in noise, though it is certainly possible to suppress the inversion of the bias. Under the circumstances, it was impossible in the past to obtain a magnetic recording medium, in which a domain is not generated over the entire data region of the disc, which is stable to an external magnetic field, and which is low in noise generation.

BRIEF SUMMARY OF THE INVENTION

A first object of the present invention is to provide a perpendicular magnetic recording medium whose magnetization is not attenuated by the external magnetic field, whose signal is stable even if recording and reproducing is repeated, and whose noise is low.

A second object of the present invention is to provide a magnetic recording-reproducing apparatus whose magnetization is not attenuated by an external magnetic field, whose signal is stable even if recording and reproducing is repeated, and whose noise is low.

According to a first aspect of the present invention, there is provided a perpendicular magnetic recording medium, comprising a nonmagnetic substrate, a cobalt alloy bias layer formed on the nonmagnetic substrate, a soft magnetic layer formed on the cobalt alloy bias layer and containing iron or cobalt as a main component, and a perpendicular magnetic recording layer, wherein the direction of residual magnetization of the cobalt alloy bias layer faces one direction of its radial direction, and the perpendicular magnetic recording medium satisfies the relationship given below:

$$Ms_{soft} \times (t_{soft} - 40\ nm) > Ms_{soft} \times 40\ nm + Ms_{bias} \times t_{bias}$$

where, $t_{bias}$ denotes the thickness of the cobalt alloy bias layer, $Ms_{bias}$ denotes the saturation magnetization of the cobalt alloy bias layer, $t_{soft}$ denotes the thickness of the soft magnetic layer, which falls within a range of between 40 nm and 200 nm, and $Ms_{soft}$ denotes the saturation magnetization of the soft magnetic layer.

According to a second aspect of the present invention, there is provided a magnetic recording-reproducing apparatus, comprising a magnetic recording medium, driving mechanism for supporting and rotating the magnetic recording medium, and a magnetic head for recording information in and reproducing the recorded information from the magnetic recording medium, wherein the magnetic recording medium comprises a nonmagnetic substrate, a cobalt alloy bias layer formed on the nonmagnetic substrate, a soft magnetic layer formed on the cobalt alloy bias layer and containing iron or cobalt as a main component, and a perpendicular magnetic recording layer, wherein the direction of residual magnetization of the cobalt alloy bias layer faces one direction of its radial direction, and the perpendicular magnetic recording medium satisfies the relationship given below:

$$Ms_{soft} \times (t_{soft} - 40 \, nm) > Ms_{soft} \times 40 \, nm + Ms_{bias} \times t_{bias}$$

where, $t_{bias}$ denotes the thickness of the cobalt alloy bias layer, $Ms_{bias}$ denotes the saturation magnetization of the cobalt alloy bias layer, $t_{soft}$ denotes the thickness of the soft magnetic layer, which falls within a range of between 40 nm and 200 nm, and $Ms_{soft}$ denotes the saturation magnetization of the soft magnetic layer.

According to the present invention, the intensity of the bias magnetic field is increased so as to make it possible to prevent an inverse domain from being generated over the entire data region of the disc and to suppress spike noise generation. Also, noise generated from the bias layer is effectively shielded by the soft magnetic layer so as to prevent the magnetization from being attenuated by an external magnetic field. Further, magnetic recording with a low noise can be performed with a stable signal even if recording-reproducing is repeated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
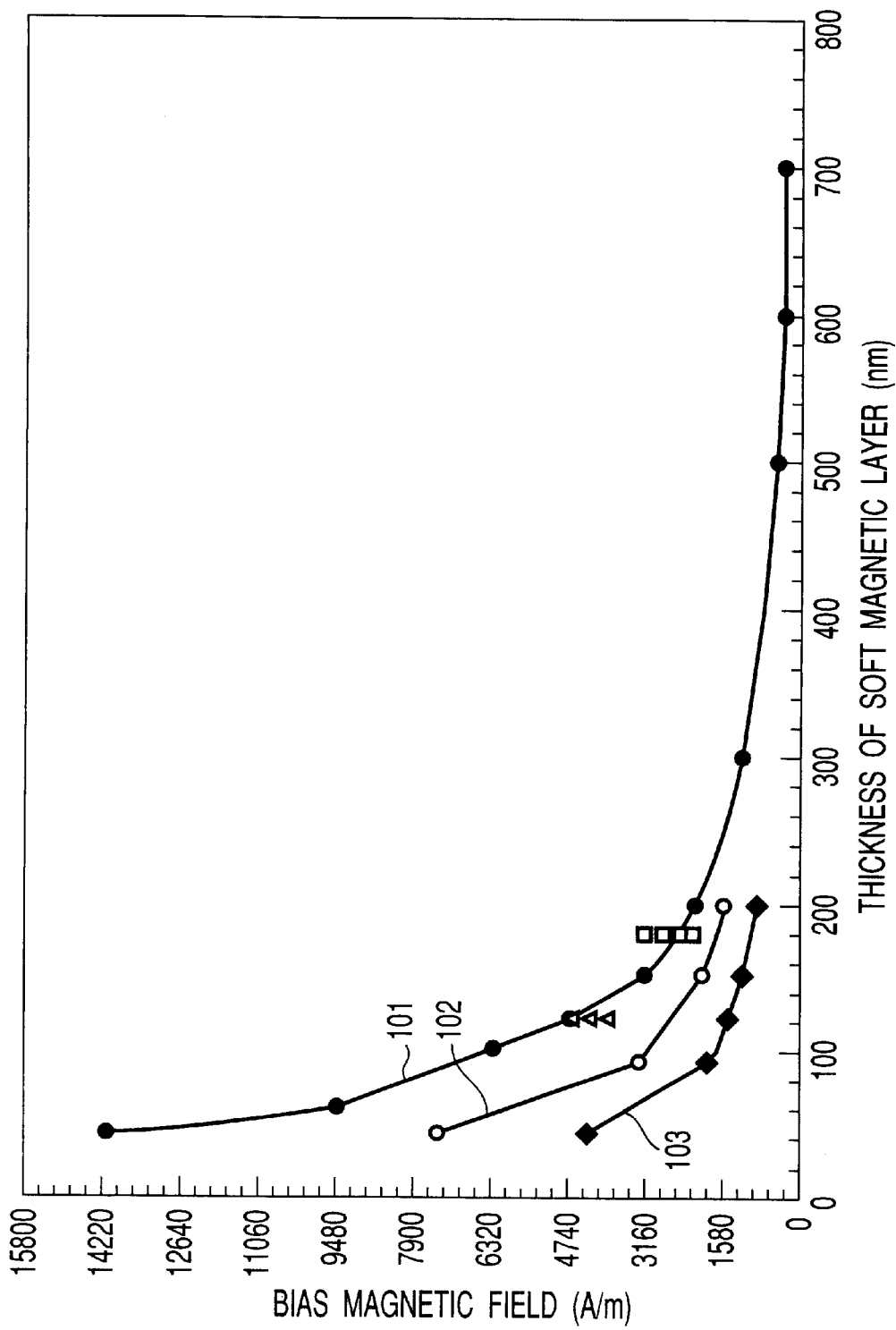
FIG. 1 is a graph showing the relationship between the thickness of the soft magnetic layer and the bias magnetic field.

The present invention provides a perpendicular magnetic recording medium comprising a nonmagnetic substrate and a perpendicular magnetic recording layer. In the perpendicular magnetic recording medium of the present invention, a cobalt alloy bias layer, in which the direction of the residual magnetization faces one direction of the radial direction of the cobalt alloy bias layer, and a soft magnetic layer containing iron or cobalt as a main component are formed between the nonmagnetic substrate and the perpendicular magnetic recording layer. It should be noted that the perpendicular magnetic recording medium of the present invention satisfies the relationship given below:

$$Ms_{soft} \times (t_{soft} - 40 \, nm) > Ms_{soft} \times 40 \, nm + Ms_{bias} \times t_{bias}$$

where, $t_{bias}$ denotes the thickness of the cobalt alloy bias layer, $Ms_{bias}$ denotes the saturation magnetization of the cobalt alloy bias layer, $t_{soft}$ denotes the thickness of the soft magnetic layer, which falls within a range of between 40 nm and 200 nm, and $Ms_{soft}$ denotes the saturation magnetization of the soft magnetic layer.

On the other hand, the magnetic recording-reproducing apparatus of the present invention comprises the magnetic recording medium defined in the present invention, a driving mechanism for supporting and rotating the magnetic recording medium, and a magnetic head for recording information in and reproducing the recorded information from the magnetic recording medium.

According to the present invention, a cobalt alloy bias layer whose direction of residual magnetization faces one direction of its radial direction is formed between the nonmagnetic substrate and the soft magnetic layer of the perpendicular magnetic recording medium so as to increase the bias magnetic field, thereby making it possible to prevent an inverse domain from being generated over the entire data region of the perpendicular magnetic recording medium and to suppress spike noise generation. Further, the relationship among the thickness and the saturation magnetization of each of the cobalt alloy bias layer and the soft magnetic layer is defined in the present invention, making it possible to allow the soft magnetic layer to effectively shield the noise generated from the bias layer.

If the direction of the residual magnetization does not face one direction of the radial direction, inverse domains are generated in the soft magnetic layer, which cause a spike noise.

Further, if the relationship among the thickness and the saturation magnetization of each of the cobalt alloy bias layer and the soft magnetic layer fails to meet the particular correlation defined in the present invention, the magnetic field generated by the dispersion of magnetization of the bias layer extends to reach the magnetic head, which generates noise.

The cobalt alloy bias layer, which differs from the soft magnetic layer, is a layer which applies a magnetic field of one direction to the soft magnetic layer. The cobalt alloy bias layer is formed of a material having the characteristics of the magnetic field facing one direction, within a plane, which inhibits reversal of the magnetic field. The material having these particular characteristics includes, for example, CoPt, CoCrPt, CoCrTa, CoCrPtTa, CoCrPtTaB, CoPtO, CoPtCrO, CoNiPt, CoNiPtCr, CoSm and FePt.

It is desirable for the cobalt alloy bias layer to have a coercivity not lower than 160,000 A/m. It is also desirable for the ratio Mr/Ms, where Mr represents the residual magnetization in the radial direction of the cobalt alloy bias layer and the soft magnetic layer, and Ms represents saturation magnetization, to be not smaller than 0.97. In this case, the dispersion of magnetization of the cobalt alloy bias layer is suppressed so as to further suppress the noise generation.

The bias magnetic field imparted by the bias layer to the soft magnetic layer is determined by the exchange coupling state at the interface between the bias layer and the soft magnetic layer. The energy per unit surface area $\gamma(erg/cm^2)$ at the interface is represented by: $\gamma = Ha \times Ms_{soft} \times t_{soft}$.

FIG. 1 is a graph showing the relationship between the thickness of the soft magnetic layer and the bias magnetic field. Curve 101 shown in the graph represents the case where the soft magnetic layer is formed of CoZrNb and the cobalt alloy bias layer is formed of CoCrPtTaB. Curve 102 shown in the graph represents the case where the soft magnetic layer is formed of CoFe and the cobalt alloy bias layer is formed of CoPtCrO. Further, curve 103 shown in the graph represents the case where the soft magnetic layer is formed of FeCoN and the cobalt alloy bias layer is formed of CoCrPt. It should also be noted that square marks □ and triangular marks Δ are plotted in the graph of FIG. 1. The square marks □ represent the case where the soft magnetic layer is formed of CozrNb and the cobalt alloy bias layer is formed of CoPt. On the other hand, the triangular marks Δ represent the case where the soft magnetic layer is formed of CoZrNb and the cobalt alloy bias layer is formed of Co.

Where Fe or Co is used as a main component of the soft magnetic layer and the bias layer is formed of a cobalt alloy, it is effective for the thickness of the soft magnetic layer to be not larger than 200 nm, preferably, not larger than 150 nm, in order to increase the bias magnetic field to at least 1580 A/cm and to prevent a domain wall from extending over the data region of the magnetic recording medium and in order to prevent the residual magnetization from being lowered even if a magnetic field of 1580 A/cm is applied. If the thickness of the soft magnetic layer is not larger than 200 nm, the domain wall, even if formed in the outer circumferential region and the inner circumferential region of the magnetic recording medium, does not extend over the data region of the magnetic recording medium. Also, if the thickness of the soft magnetic layer is not larger than 150 nm, the domain is not formed over the entire region of the magnetic recording medium, with the result that, even if a magnetic field not lower than 1580 A/cm is applied to the medium, the residual magnetization is brought back to the original state.

As described above, in the double-layered perpendicular medium, it is effective to allow the thickness of the soft magnetic layer to be not larger than 200 nm, preferably not larger than 150 nm. Under the circumstances, the present inventors prepared a magnetic recording medium comprising a soft magnetic layer having a thickness of 120 nm and a bias layer having a thickness of 150 nm so as to perform W/R evaluation. It has been found that a complex noise is formed in the waveform actually reproduced. It is considered reasonable to understand that the magnetic field of the recording head causes the bias layer to be reversed or, even if not reversed, causes a very small change in magnetization to take place in the bias layer in the running direction of the magnetic head, with the result that the magnetization change is transmitted as a noise to the head via the soft magnetic layer.

It is also considered reasonable to understand that, since the perpendicular recording layer and the bias layer differ from each other in the wave form of the signal, a complex noise is generated on the reproduced wave form. This phenomenon provides a particularly serious problem in a case where each of the perpendicular recording layer and the soft magnetic layer is thin.

Since the area of the magnetic pole of the head is small, the intensity of the magnetic field generated from the head is rapidly attenuated with the increase in distance, with the result that the magnetic field of a high intensity is not directly applied to the bias layer. However, it is considered reasonable to understand that a change in the magnetization on the surface of the soft magnetic layer is transmitted to a lower portion of the soft magnetic layer so as to bring about an inversion through the exchange coupling force exerting in this step on the interface. It follows that it is important to impart an anisotropy large enough to overcome the change in magnetization noted above to the bias layer. It should be noted in this connection that the exchange coupling force J in the interface is represented as follows:

$$(\tfrac{1}{2}) \times Hc \times Ms_{bias} \times t_{bias} > Ms_{soft} \times t_{soft} \times Ha = J$$

where Ha represents the bias magnetic field applied to the soft magnetic layer, Ms represents the amount of saturation magnetization of the soft magnetic layer, $t_{soft}$ represents the thickness of the soft magnetic layer, Hc represents the coercive force of the bias film, $Ms_{bias}$ represents the amount of saturation magnetization of the bias film, and $t_{bias}$ represents the thickness of the bias film.

As apparent from the formula given above, it is effective to increase the coercive force of the bias layer or to increase the thickness of the bias layer. However, where the thickness of the bias layer is increased, the problem of dispersion of magnetization in the bias layer propagating through the soft magnetic layer and increasing the noise transmitted to the head is rendered serious, though it is certainly possible to eliminate reversal of magnetization.

The present inventors have found that, in order to avoid the problem noted above, it is necessary for the amount of saturation magnetization $Ms_{soft}$ of the soft magnetic layer, the thickness $t_{soft}$ of the soft magnetic layer, the amount of saturation magnetization $Ms_{bias}$ of the bias film and the thickness $t_{bias}$ of the bias film to meet the correlation given below:

$$Ms_{soft} \times (t_{soft} - 40 \ nm) > Ms_{soft} \times 40 \ nm + Ms_{bias} \times t_{bias}$$

The thickness 40 nm of the soft magnetic layer denotes the thickness that prevents the direction of residual magnetization from being changed greatly and represents the value determined by the exchange stiffness constant and the anisotropic energy of the soft magnetic layer. It is reasonable to understand that the soft magnetic layer using mainly Co or Fe has a thickness of about 40 nm. The soft magnetic layer apart from the bias layer by at least 40 nm is capable of shielding the dispersion of magnetization so as to suppress noise generation.

It is necessary for the coercive force Hc of the bias layer to meet the correlation given below:

$$Hc > 2 \times (Ms_{soft} \times t_{soft} / Ms \times t_{bias}) \times Ha$$

Where the soft magnetic layer contains Fe or Co as a main component and a Co alloy is used for forming the bias layer, the bias magnetic field Ha is 29,230 A/m. Therefore, the coercive force Hc of about 58,460 A/m is required. It should be noted, however, that, in view of the dispersion of the coercive force Hc of grains in the film and the inversion of magnetization performed with the smallest magnetic field, it is desirable for the coercive force Hc of the bias layer to be at least 160,000 A/m, which is four times the value given above.

Also, it is desirable for the bias layer to be low in noise generation when the magnetization is saturated. Further, it is not absolutely necessary for the magnetic particles to be isolated from each other in the bias layer as in the longitudinal magnetic recording layer, and it is effective to make the bias layer strong against thermal decay.

The present invention will now be described in detail with reference to the accompanying drawings.

Figure 2:
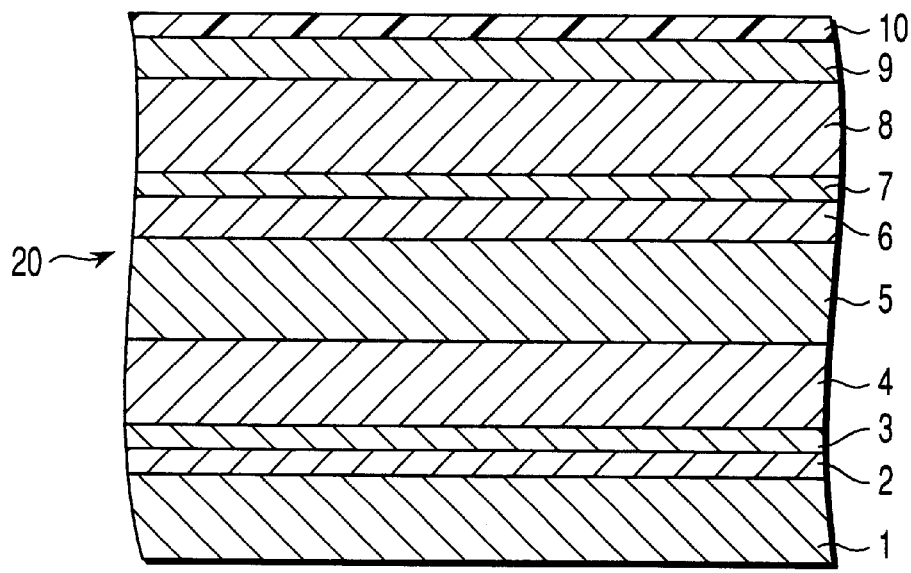
FIG. 2 is a cross sectional view showing, as an example, the construction of a perpendicular magnetic recording medium according to one embodiment of the present invention.

FIG. 2 is a cross sectional view showing the construction of the perpendicular magnetic recording medium 20 of the present invention. As shown in the drawing, the magnetic recording medium 20 is of a laminate structure comprising a nonmagnetic substrate 1, a seed layer 2, an underlying layer 3 made of, for example, a chromium alloy, a cobalt alloy bias layer 4, a soft magnetic layer 5 made of, for example, CoZrNb or an FeCo series alloy, a seed layer 6 made of, for example, titanium, an underlying layer 7 made of, for example, ruthenium, a perpendicular magnetic recording layer 8 made of, for example, a CoCrPt series alloy or a CoPtCrO series alloy, a protective layer 9 made of, for example, carbon, and a lubricating layer 10 made of, for example, perfluoropolyether, which are laminated one upon the other in the order mentioned.

Preferably, it is desirable to use, for example, a 2.5 inch chemical reinforced aluminosilicate glass, a crystallized glass, silicon, an aluminum alloy, carbon, polyimide or polyester for forming the nonmagnetic substrate.

The seed layer 2 and the underlying layer 3, which collectively serve to control the orientation of the bias layer so as to suppress the dispersion and to align the magnetization of the bias layer in a planar one direction, are optionally formed as required. It is possible to use, for example, NiAl, MgO or TiN for forming the seed layer 2 for controlling the orientation. On the other hand, it is possible to use, for example, a chromium alloy, a vanadium alloy, a niobium alloy, a tantalum alloy or a tungsten alloy for forming the underlying layer 3.

The soft magnetic layer 5 can be formed of, for example, a CoZrNb alloy, a CoZrTa alloy, a CoFe alloy, a NiFe alloy, an FeAlSi alloy, an FeTaC alloy or an FeTaN alloy.

The seed layer 6, which is optionally formed as required, serves to control the orientation and particle diameter of the perpendicular recording layer through the control of the orientation and particle diameter of the underlying layer. On the other hand, the underlying layer 7, which is also formed optionally as required, serves to improve the perpendicular orientation of the perpendicular magnetic layer formed on the underlying layer 7 and to reduce the particle diameter.

The seed layer 6 can be formed of, for example, Ti, TiN or NiAl. On the other hand, the underlying layer 7 can be formed of, for example, Ru, Hf, a nonmagnetic CoCr alloy, Pt or Pd.

The perpendicular recording layer 8 can be formed of, for example, a CoCrPt series alloy or a CoPtCrO series alloy, a Co/Pt multi-layered film, a Co/Pd multi-layered film, an FePt ordered alloy, or a CoPt systematic alloy.

The protective layer 9 and the lubricating layer 10 are also formed as required. The protective layer 9 can be formed of, for example, a sputtered carbon or a CVD carbon. On the other hand, the lubricating layer 10 can be formed of, for example, perfluoropolyether or hydrofluoroether. The lubricating layer 10 can be formed by, for example, a dipping method.

The magnetic recording medium described above can be used in a magnetic recording-reproducing apparatus described in the following.

Figure 3:
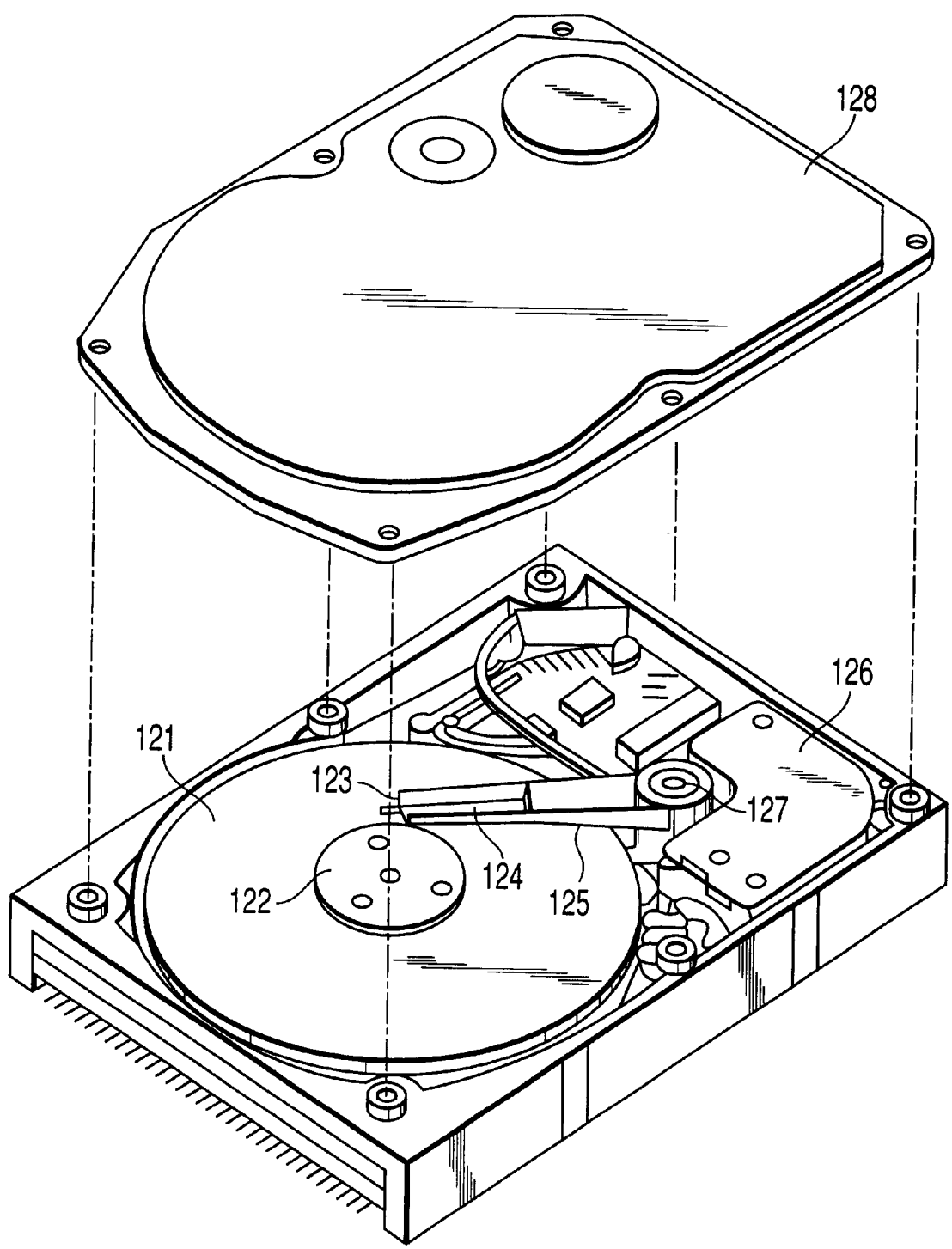
FIG. 3 is an oblique view, partly broken, showing, as an example, a magnetic recording-reproducing apparatus according to one embodiment of the present invention.

FIG. 3 is an oblique view, partly broken away, exemplifying a magnetic recording-reproducing apparatus of the present invention. Specifically, a magnetic disc 121, which is of a rigid structure, of the present invention for recording information is mounted to a spindle 122 that is rotated at a predetermined angular speed by a spindle motor (not shown). A slider 123 having a magnetic head mounted thereon, said magnetic head gaining access to the magnetic disc 121 for recording-reproducing information, is mounted on the tip of a suspension 124 formed of a thin plate-like leaf spring. The suspension 124 is connected to one side of an arm 125 having a bobbin or the like for holding a driving coil (not shown).

A voice coil motor 126, which is a kind of linear motor, is mounted on the other side of the arm 125. The voice coil motor 126 is formed of a magnetic circuit consisting of a driving coil (not shown) at the bobbin portion of the arm 125, and a permanent magnet and a counter yoke arranged to face each other with the driving coil interposed therebetween.

The arm 125 is held by ball bearings (not shown) arranged in upper and lower portions of a fixing shaft 127 and is rotated and swung by the voice coil motor 126. In other words, the position of the slider 123 on the magnetic disc 121 is controlled by the voice coil motor 126. Incidentally, reference numeral 128 in FIG. 3 represents a lid.

Examples of the present invention will now be described for clarifying, in more detail, the technical idea of the present invention.

EXAMPLE 1

A magnetic recording medium 20 constructed as shown in FIG. 2 was prepared as follows.

In the first step, prepared was a substrate 1 having a diameter of 2.5 inches and formed of a chemical reinforced aluminosilicate glass. Then, a NiAl alloy seed layer was formed on the substrate 1 by a sputtering method, followed by forming an underlying layer 3 by a sputtering method on the seed layer 2 with a chromium alloy used as a target. After formation of the underlying layer 3, a CoPt alloy bias layer 4 having a saturation magnetization Ms of 1200 (emu/cc) was formed in a thickness of 80 nm on the underlying layer 3 by a sputtering method under the conditions that the bias layer 4 has a coercive force of at least 160,000 A/m, exhibits a strong mutual function among the particles, and has a large square ratio.

In the next step, a soft magnetic layer 5 consisting of a CozrNb alloy having a saturation magnetization of 1300 (emu/cc) was formed to a thickness of 180 nm on the bias layer 4 by a sputtering method. After formation of the soft magnetic layer 5, a seed layer 6 was formed by a sputtering method with a titanium alloy used as a target, followed by forming an underlying layer 7 to a thickness of 20 nm on the seed layer 6 with rhenium used as a target. Then, a CoPtCrO series perpendicular magnetic recording layer 8 was formed to a thickness of 25 nm on the underlying layer 7 by an oxygen-added sputtering method with an alloy of 68at %.Co-20at. %Pt-12at. %Cr used as a target.

A DC magnetron sputtering was employed in all the sputtering steps included in the process of preparing the magnetic recording medium.

Further, a protective film 9 consisting of carbon and having a thickness of 7 nm was formed on the perpendicular magnetic recording layer 8 by a sputtering method, followed by forming a lubricating layer 10 consisting of perfluoropolyether on the surface of the protective film 9 by a dip coating method, thereby obtaining the perpendicular magnetic recording medium 20.

A pulse magnetic field not lower than 790 k A/m, which sufficiently permits saturation of the bias layer having a half width in the order of 10 msec in the radial direction, was applied to the perpendicular magnetic recording medium thus prepared by using a magnetizing jig used exclusively for a disc so as to fix the magnetization in a radial direction. When a voltage of 200V was applied to the magnetizing jig, the recording medium 20 was magnetized in a radial direction in an intensity not lower than 948 k A/m.

A single magnetic pole having a track width of 0.6 μm was used for writing and a head using a GMR element having a track width of 0.4 μm and gap length of 90 nm was used for reproduction in respect of the perpendicular magnetic recording medium. In the first step, the write current was increased from 2 mA to 50 mA so as to examine the isolated wave form of 25 kFCI, with the result that obtained was a satisfactory rectangular wave form free from strong noise. Then, a DC erasure was performed with 50 mA, and the writing and DC erasure were repeated at the optimum recording current. An increase in the DC noise and a change in the wave form were not observed. The medium S/N was measured for these media under a frequency of 200 MHz and a recording frequency of 520 kFCI.

A disc including the various layers up to the soft magnetic layer was prepared under the conditions equal to those for preparing the perpendicular magnetic recording medium, and the domain state of the soft magnetic layer over the entire surface of soft magnetic layer sample was observed with an optical surface analyzer (OSA) utilizing the Kerr effect so as to look into the domain structure of the entire surface of the soft magnetic layer.

Also, the state of the noise spikes of the resultant soft magnetic layer sample was measured using a single pole magnetic pole having a track width of 0.6 μm for writing and a head using a GMR element having a track width of 0.4 μm and a gap length of 90 nm for reproduction.

Figure 4:
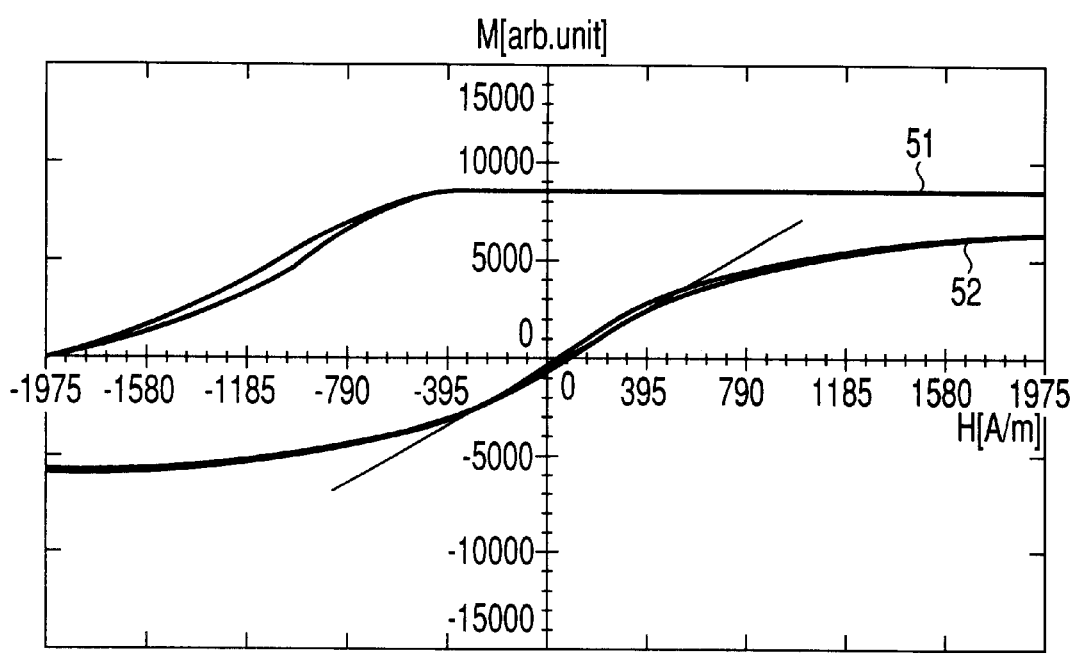
FIG. 4 is a graph showing an M-H magnetization curve.

A VSM sample was cut out of the disc having various layers up to the soft magnetic layer formed under the conditions equal to those employed for preparing the perpendicular magnetic recording medium, and measurement of magnetization was started from the application of the magnetic field of +790 A/m in the magnetizing direction in a radial direction of the disc so as to obtain an M-H magnetization curve. A curve 51 in the graph of FIG. 4 shows the results. It has been confirmed that the ratio Mr/Ms of the residual magnetization Mr to the saturation magnetization Ms was not smaller than 0.97. If the magnetic field is returned after application of 1580 A/m, the amount of magnetization is returned to the original value. Therefore, it is considered reasonable to understand that the reduction of Mr, i.e., 1−Mr/Ms, which is 0.03, is caused by the dispersion in the circumferential direction, not by the formation of the inversion domain. A coupling energy γ of 0.82 erg/cm$^2$, i.e., γ=0.82 erg/cm$^2$, was estimated from the bias magnetic field $H_{bias}$ when the magnetization was returned from 3950 A/m. When the fixing force of magnetization was measured by the method of measuring the residual magnetization in the radial direction, a reduction of the residual magnetization was not recognized relative to the application of 15,800 A/m magnetic field.

Also, a magnetic field was applied in the head running direction of the perpendicular magnetic recording medium so as to measure the magnetization, thereby obtaining an M-H curve. A curve 52 in the graph of FIG. 4 shows the result. It was possible to obtain a relative dimagnetic constant not smaller than 1000 in the head running direction.

Tables 3 and 4 show the experimental data in respect of the value of bias magnetic field $H_{bias}$, the value of $Ms_{soft}×$ ($t_{soft}$−40 nm)/$Ms_{soft}×$40 nm+$Ms_{bias}×t_{bias}$, the value of Mr/Ms, the value of $Hc_{bias}$, the presence of the domain wall, spike noise generation caused by repetitive recording, and the medium S/N.

EXAMPLES 2 TO 14

Perpendicular magnetic recording media were obtained as in Example 1, except that the material and thickness of the soft magnetic layer, the material and thickness of the cobalt-containing bias layer, and the material of the perpendicular magnetic recording layer were changed as shown in Tables 1 and 2.

Figure 5:
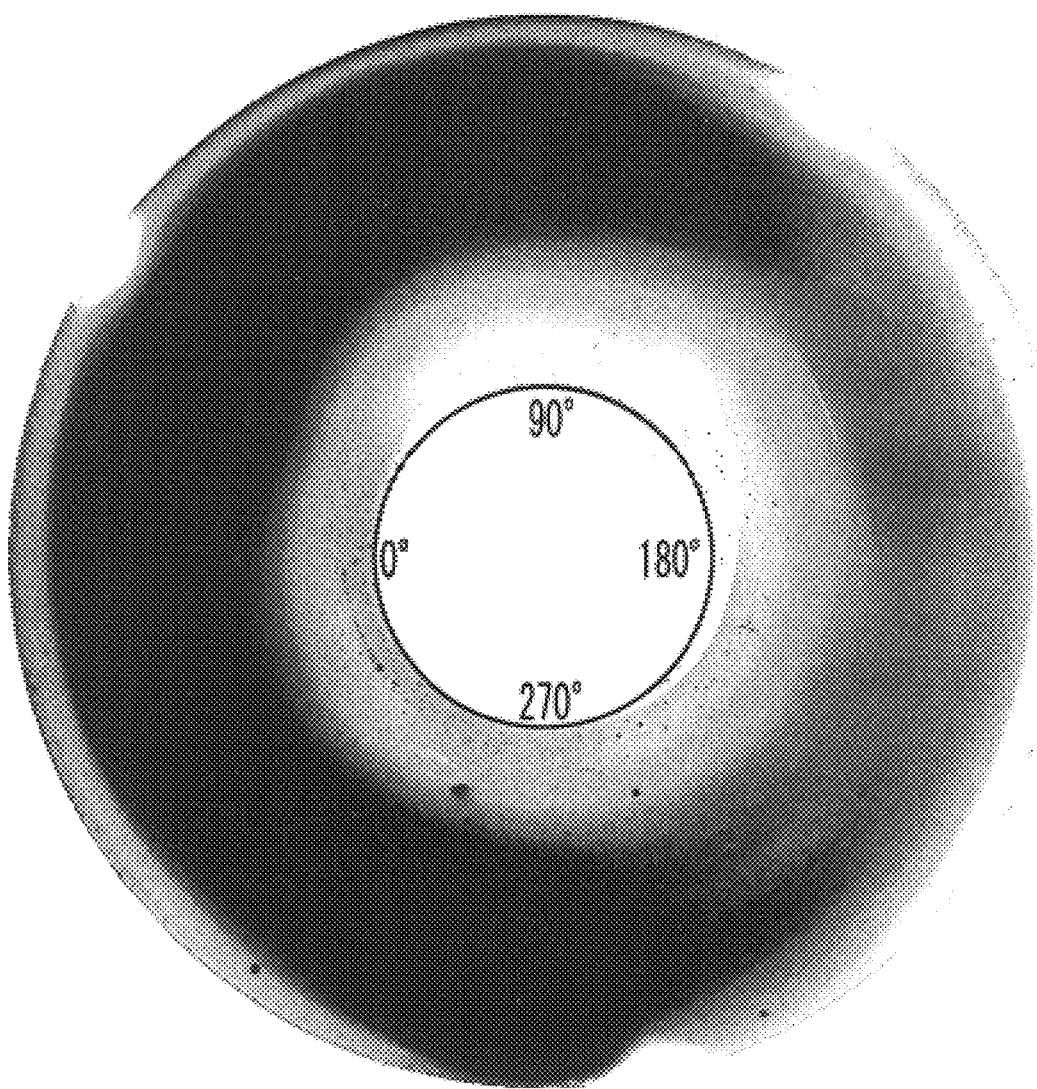
FIG. 5 is photo showing the result of measurement by an optical surface analyzer.

Incidentally, a soft magnetic layer sample, which did not include the seed layer 6, the underlying layer 7, the perpendicular magnetic recording layer 8, the protective film 9 and the lubricating layer 10, was prepared by forming the layers up to the soft magnetic layer 5 on the nonmagnetic substrate 1 as in Example 6. The soft magnetic layer sample thus prepared was observed with an optical surface analyzer (OSA) utilizing the Kerr effect so as to examine the domain structure on the entire surface of the soft magnetic layer. FIG. 5 is a photo showing the result. As is apparent from FIG. 5, it was confirmed that a domain was not generated on the surface of the soft magnetic layer.

Figure 6:
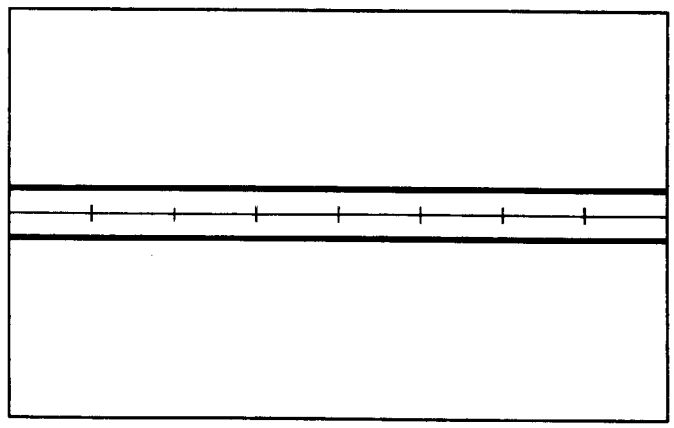
FIG. 6 is a graph showing the state of noise of a soft magnetic layer sample.

Also, the state of noise of the soft magnetic layer sample was measured using a single pole magnetic pole having a track width of 0.6 μm for writing and a head using a GMR element having a track width of 0.4 μm and a gap length of 90 nm for reproduction. FIG. 6 shows the result. As apparent from FIG. 6, it was confirmed that a spike noise had not been observed.

Figure 7:
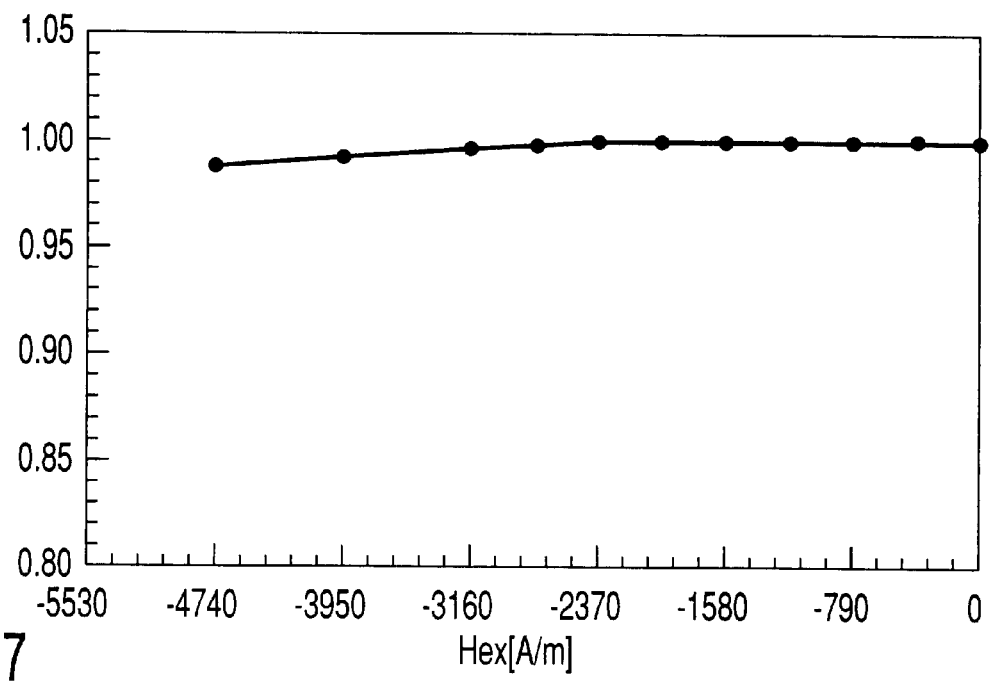
FIG. 7 is a graph showing the relationship between the magnetic field and the ratio of the residual magnetization to the initial residual magnetization.

Concerning Example 7, a magnetic field was applied once to a sample cut out of the resultant perpendicular magnetic recording medium in a direction opposite to the direction of the bias application, followed by removing the magnetic field so as to measure the amount of residual magnetization Mr. FIG. 7 is a graph showing the relationship between the magnetic field and the ratio of residual magnetization to initial residual magnetization.

As shown in FIG. 7, it has been found that, where the coercive force of the bias layer is not lower than 160,000 A/m, the magnetization is substantially returned to the original state until the applied magnetic field is increased to 2370 A/m.

COMPARATIVE EXAMPLES 1 TO 19

Perpendicular magnetic recording media were obtained as in Example 1, except that the material and thickness of the soft magnetic layer, the material and thickness of the cobalt-containing bias layer, and the material of the perpendicular magnetic recording layer were changed as shown in Tables 1 and 2. Tables 3 and 4 show experimental data concerning the perpendicular magnetic recording media thus obtained in respect of the value of bias magnetic field $H_{bias}$, the value of $Ms_{soft}×(t_{soft}$−40 nm)/$Ms_{soft}×$40 nm+$Ms_{bias}×t_{bias}$, the value of Mr/Ms, the value of $Hc_{bias}$, the value of $Hc_{critical}$ the presence of a domain wall, spike noise generation, and the S/N value.

Figure 8:
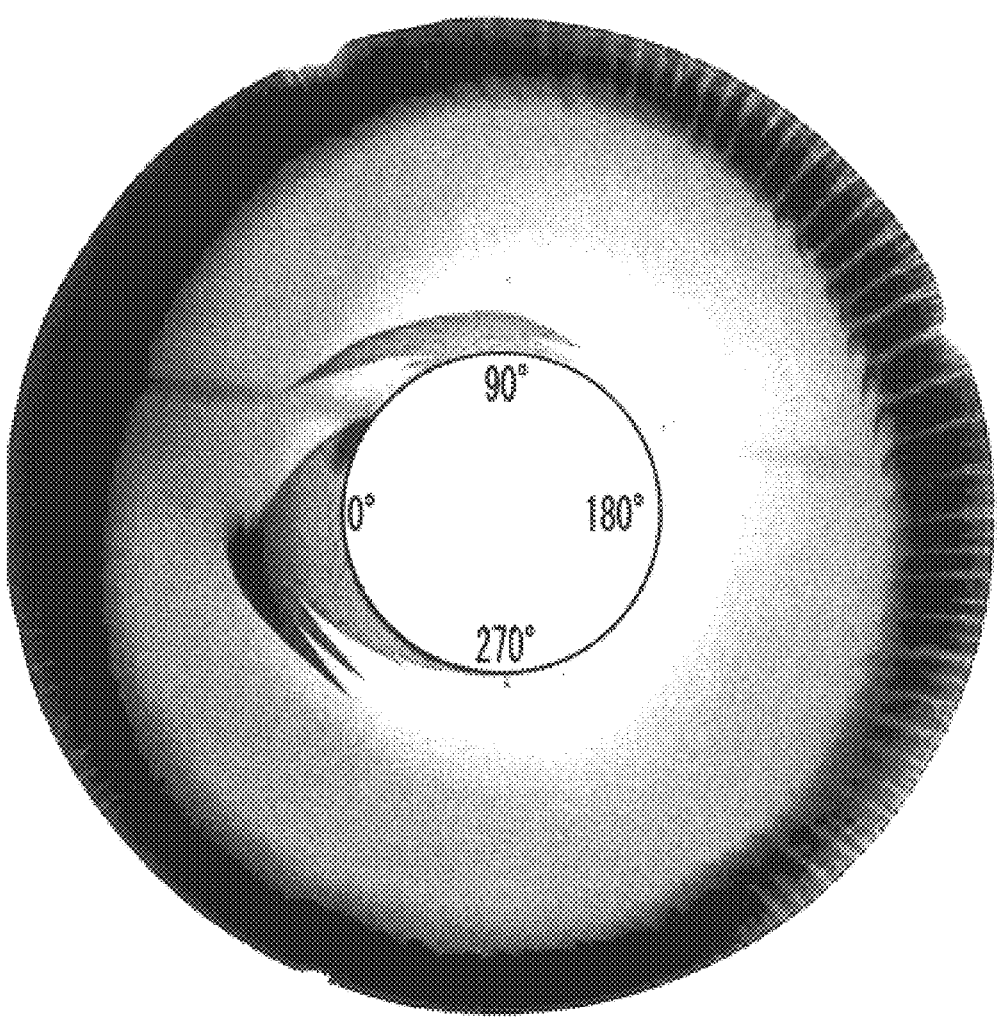
FIG. 8 is a photo showing the result of measurement by an optical surface analyzer.

Concerning Comparative Example 1, the domain structure on the entire surface of the soft magnetic layer was examined as in Example 6. FIG. 8 is a photo showing the data obtained by an OSA. As shown in FIG. 8, a domain wall extending over the data region was found to be present.

Figure 9:
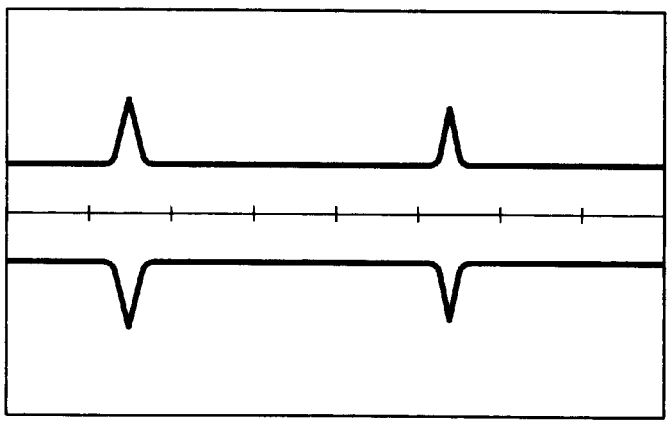
FIG. 9 is a graph showing the state of noise of a soft magnetic layer sample.

The state of noise was also measured as in Example 6. FIG. 9 shows the result. As shown in FIG. 9, it was confirmed that a spike noise had been generated under the influence of the domain wall.

TABLE 1

| | Soft magnetic film | | | Hard film | | | Perpendicular recording layer |
|---|---|---|---|---|---|---|---|
| | Material | Ms (emu/cc) | Thickness (nm) | Material | Ms (emu/cc) | Thickness (nm) | |
| Comparative Example 1 | CoZrNb | 1300 | 700 | CoCrPtTaB | 500 | 60 | CoCrPt |
| Comparative Example 2 | CoZrNb | 1300 | 500 | CoCrPtTaB | 500 | 60 | CoCrPt |
| Comparative Example 3 | CoZrNb | 1300 | 300 | CoCrPtTaB | 500 | 60 | CoCrPt |
| Comparative Example 4 | CoZrNb | 1300 | 200 | CoCrPtTaB | 500 | 60 | CoCrPt |
| Comparative Example 5 | CoZrNb | 1300 | 100 | CoCrPtTaB | 500 | 60 | CoCrPt |
| Comparative Example 6 | CoZrNb | 1300 | 60 | CoCrPtTaB | 500 | 60 | CoCrPt |
| Comparative Example 7 | CoZrNb | 1300 | 40 | CoCrPtTaB | 500 | 60 | CoCrPt |
| Comparative Example 8 | CoZrNb | 1300 | 180 | CoPt | 1200 | 200 | CoPtCrO |
| Comparative Example 9 | CoZrNb | 1300 | 180 | CoPt | 1200 | 150 | CoPtCrO |
| Example 1 | CoZrNb | 1300 | 180 | CoPt | 1200 | 80 | CoPtCrO |
| Example 2 | CoZrNb | 1300 | 180 | CoPt | 1200 | 60 | CoPtCrO |
| Comparative Example 10 | CoZrNb | 1300 | 150 | CoCrPtTaB | 500 | 250 | CoCrPt |
| Example 3 | CoZrNb | 1300 | 150 | CoCrPtTaB | 500 | 120 | CoCrPt |
| Example 4 | CoZrNb | 1300 | 150 | CoCrPtTaB | 500 | 80 | CoCrPt |
| Example 5 | CoZrNb | 1300 | 150 | CoCrPtTaB | 500 | 60 | CoCrPt |
| Example 6 | CoZrNb | 1300 | 150 | CoCrPtTaB | 500 | 40 | CoCrPt |

TABLE 2

| | Soft magnetic film | | | Hard film | | | Perpendicular recording layer |
|---|---|---|---|---|---|---|---|
| | Material | Ms (emu/cc) | Thickness (nm) | Material | Ms (emu/cc) | Thickness (nm) | |
| Comparative Example 11 | CoZrNb | 1300 | 120 | CoCrPtTaB | 500 | 250 | CoPtCrO |
| Comparative Example 12 | CoZrNb | 1300 | 120 | CoCrPtTaB | 500 | 200 | CoPtCrO |
| Comparative Example 13 | CoZrNb | 1300 | 120 | CoCrPtTaB | 500 | 150 | CoPtCrO |
| Example 7 | CoZrNb | 1300 | 120 | CoCrPtTaB | 500 | 60 | CoPtCrO |
| Example 8 | CoZrNb | 1300 | 120 | CoCrPtTaB | 500 | 40 | CoPtCrO |
| Example 9 | CoZrNb | 1300 | 180 | Co | 1200 | 80 | CoPtCrB |
| Example 10 | CoZrNb | 1300 | 180 | CoPt | 1200 | 80 | CoPtCrB |
| Comparative Example 14 | Co90Fe10 | 1600 | 200 | CoPtCrO | 300 | 40 | CoPtCrO |
| Example 11 | Co90Fe10 | 1600 | 150 | CoPtCrO | 300 | 40 | CoPtCrO |
| Example 12 | Co90Fe10 | 1600 | 90 | CoPtCrO | 300 | 40 | CoPtCrO |
| Comparative Example 15 | Co90Fe10 | 1600 | 90 | CoPtCrO | 300 | 120 | CoPtCrO |
| Comparative Example 16 | Co90Fe10 | 1600 | 40 | CoPtCrO | 300 | 120 | CoPtCrO |
| Comparative Example 17 | FeCoN | 1800 | 200 | CoCrPt | 300 | 30 | CoPtCrTa |
| Example 13 | FeCoN | 1800 | 150 | CoCrPt | 300 | 30 | CoPtCrTa |
| Example 14 | FeCoN | 1800 | 120 | CoCrPt | 300 | 120 | CoPtCrTa |
| Comparative Example 18 | FeCoN | 1800 | 90 | CoCrPt | 300 | 120 | CoPtCrTa |
| Comparative Example 19 | FeCoN | 1800 | 40 | CoCrPt | 300 | 120 | CoPtCrTa |

TABLE 3

| | Bias magnetic field H bias (A/m) | $Ms_{softt} \times (t_{softt} - 40\ nm)/[Ms_{softt} \times 40\ nm + Ms_{bias} \times t_{bias}]$ | Mr/Ms | Hc bias (A/m) | Presence of domain wall | Generation of spike noise | Soop Nmr ms (dB) |
|---|---|---|---|---|---|---|---|
| Comparative Example 1 | 237 | 10.5 | 0.93 | 300200 | × | — | 36.5 |

TABLE 3-continued

| | Bias magnetic field H bias (A/m) | $Ms_{soft} \times (t_{softt} - 40\ nm)/[Ms_{softt} \times 40\ nm + Ms_{bias} \times t_{bias}]$ | Mr/Ms | Hc bias (A/m) | Presence of domain wall | Generation of spike noise | Soop Nmr ms (dB) |
|---|---|---|---|---|---|---|---|
| Comparative Example 2 | 395 | 7.3 | 0.94 | 300200 | × | — | 36 |
| Comparative Example 3 | 1185 | 4.1 | 0.96 | 300200 | × | — | 35.5 |
| Comparative Example 4 | 2133 | 2.5 | 0.98 | 300200 | ○ | None | 35.5 |
| Comparative Example 5 | 6320 | 1.0 | 0.99 | 300200 | ⊙ | None | 28 |
| Comparative Example 6 | 9480 | 0.3 | 0.99 | 300200 | ⊙ | None | 26 |
| Comparative Example 7 | 6320 | 0.0 | 0.99 | 300200 | ⊙ | None | 25 |
| Comparative Example 8 | 2370 | 0.6 | 0.95 | 221200 | ⊙ | None | 24.5 |
| Comparative Example 9 | 2212 | 0.8 | 0.96 | 229100 | ⊙ | None | 25.5 |
| Example 1 | 2765 | 1.2 | 0.98 | 237000 | ⊙ | None | 33.5 |
| Example 2 | 3160 | 1.5 | 0.98 | 240950 | ⊙ | None | 34 |
| Comparative Example 10 | 3476 | 0.8 | 0.95 | 240950 | ⊙ | None | 26 |
| Example 3 | 3476 | 1.3 | 0.97 | 268600 | ⊙ | None | 31.5 |
| Example 4 | 3318 | 1.6 | 0.98 | 284400 | ⊙ | None | 32.5 |
| Example 5 | 3160 | 1.7 | 1 | 300200 | ⊙ | None | 36.5 |
| Example 6 | 3160 | 2.0 | 1 | 316000 | ⊙ | None | 36 |

TABLE 4

| | Bias magnetic field H bias (A/m) | $Ms_{soft} \times (tsoftt - 40\ nm)/[Mssoftt \times 40\ nm + Msbias \times tbias]$ | Mr/Ms | Hc bias (A/m) | Presence of domain wall | Generation of spike noise | Soop Nmr ms (dB) |
|---|---|---|---|---|---|---|---|
| Comparative Example 11 | 4740 | 0.6 | 0.96 | 248850 | ⊙ | None | |
| Comparative Example 12 | 4345 | 0.7 | 0.98 | 248850 | ⊙ | None | 26.5 |
| Comparative Example 13 | 4345 | 0.8 | 0.97 | 252800 | ⊙ | None | 27 |
| Example 7 | 4740 | 1.3 | 0.99 | 300200 | ⊙ | None | 27.5 |
| Example 8 | 3950 | 1.4 | 1 | 316000 | ⊙ | None | 34.5 |
| Example 9 | 3397 | 1.2 | 0.98 | 158000 | ⊙ | Generated (large) | 34 |
| Comparative Example 10 | 2686 | 1.2 | 0.98 | 221200 | ⊙ | Generated (small) | 33.5 |
| Comparative Example 14 | 1501 | 3.4 | 1 | 331800 | × | — | |
| Example 11 | 1975 | 2.3 | 1 | 331800 | ⊙ | None | 34 |
| Example 12 | 3318 | 1.1 | 1 | 331800 | ⊙ | None | 35.5 |
| Comparative Example 15 | 3318 | 0.8 | 0.98 | 284400 | ⊙ | None | 35 |
| Comparative Example 16 | 7426 | 0.0 | 1 | 284400 | ⊙ | None | 25 |
| Comparative Example 17 | 869 | 3.6 | 1 | 252800 | × | — | |
| Example 13 | 1185 | 2.4 | 1 | 252800 | ⊙ | None | 34 |
| Example 14 | 1501 | 1.3 | 0.99 | 244900 | ⊙ | None | 34 |
| Comparative Example 18 | 1975 | 0.8 | 0.98 | 229100 | ⊙ | Generated (small) | 32 |
| Comparative Example 19 | 4424 | 0.0 | 0.98 | 229100 | ⊙ | Generated (large) | 24 |

As apparent from Tables 3 and 4, the perpendicular magnetic recording media for Comparative Examples 1 to 3 were weak in the bias magnetic field, with the result that the domains generated from the outer circumferential surfaces and the inner circumferential surfaces of the discs, which were measured by an OSA, were found to extend over the data regions. Also, the spike noise was observed in the measurement using a head, and the DC noise was found to be larger than that for the Examples of the present invention.

When it comes to the medium SNR, a satisfactory value of Soop/Nmrms>30 dB was obtained in the case of $Ms_{soft} \times (t_{soft} - 40\ nm) > Ms_{soft} \times 40\ nm + Ms_{bias} \times t_{bias}$.

On the other hand, Soop/Nmrms was found to be low, i.e., about 3 dB, in the case of $Ms_{soft} \times (t_{soft} - 40\ nm) < Ms_{soft} \times 40\ nm + Ms_{bias} \times t_{bias}$.

When it comes to the isolated wave form of 25 kFCI, the perpendicular magnetic recording medium, in which the thickness of the soft magnetic layer was not larger than 200 nm, was found to exhibit a satisfactory rectangular wave form free from strong noise. Then, a DC erasure was performed at 50 mA, and writing and DC erasure were repeated under an optimum recording current, with the result that an increase in DC noise and a change in the wave form were not observed. However, where the coercive force of the bias layer was smaller than 160,000 A/m, a small spike noise was observed during DC erasure in some cases when similar writing and erasure were repeated under maximum head recording.

Incidentally, in the Examples described above, the hard film for imparting a bias was of a single layer structure. Also, each of the bias film and the soft magnetic layer was of a single layer structure. However, even in the case of employing a laminate structure, it is possible to understand that the soft magnetic layer consists of the recording layer and the bias film positioned closest to the recording layer. It is also possible to understand that the bias film is of a laminate structure, provided that there is some exchange coupling among the layers constituting the laminate structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording disk, comprising:
    a nonmagnetic substrate;
    a cobalt alloy bias layer formed on said nonmagnetic substrate;
    a soft magnetic layer formed on said cobalt alloy bias layer and containing iron or cobalt; and
    a perpendicular magnetic recording layer;
    wherein the direction of residual magnetization of said cobalt alloy bias layer faces one direction of its radial direction, and
    said perpendicular magnetic recording medium satisfies the relationship given below:

$$Ms_{soft} \times (t_{soft} - 40\ nm) > Ms_{soft} \times 40\ nm + Ms_{bias} \times t_{bias}$$

where, $t_{bias}$ denotes the thickness of said cobalt alloy bias layer, $Ms_{bias}$ denotes the saturation magnetization of the cobalt alloy bias layer, $t_{soft}$ denotes the thickness of said soft magnetic layer, which falls within a range of between 40 nm and 200 nm, and $Ms_{soft}$ denotes the saturation magnetization of said soft magnetic layer.

2. The perpendicular magnetic recording disk according to claim 1, wherein the thickness $t_{soft}$ of said soft magnetic layer falls within a range of between 40 nm and 150 nm.

3. The perpendicular magnetic recording disk according to claim 1, wherein said cobalt alloy bias layer has a coercive force Hc not smaller than 160,000 A/m.

4. The perpendicular magnetic recording disk according to claim 1, wherein each of said cobalt alloy bias layer and said soft magnetic layer has a ratio Mr/Ms, i.e., a ratio of the residual magnetization Mr in the radial direction to the saturation magnetization Ms, of 0.97 or more.

5. A magnetic recording-reproducing apparatus, comprising:
    a magnetic recording disk;
    driving mechanism supporting and rotating said magnetic recording disk; and
    a magnetic head recording information in and reproducing the recorded information from said magnetic recording disk;
    wherein said magnetic recording disk comprises a nonmagnetic substrate, a cobalt alloy bias layer formed on said nonmagnetic substrate, a soft magnetic layer formed on said cobalt alloy bias layer and containing iron or cobalt, and a perpendicular magnetic recording layer, wherein the direction of residual magnetization of said cobalt alloy bias layer faces one direction of its radial direction, and said perpendicular magnetic recording medium satisfies the relationship given below:

$$Ms_{soft} \times (t_{soft} - 40\ nm) > Ms_{soft} \times 40\ nm + Ms_{bias} \times t_{bias}$$

where, $t_{bias}$ denotes the thickness of said cobalt alloy bias layer, $Ms_{bias}$ denotes the saturation magnetization of the cobalt alloy bias layer, $t_{soft}$ denotes the thickness of said soft magnetic layer, which falls within a range of between 40 nm and 200 nm, and $Ms_{soft}$ denotes the saturation magnetization of said soft magnetic layer.

6. The magnetic recording-reproducing apparatus according to claim 5, wherein the thickness $t_{soft}$ of said soft magnetic layer falls within a range of between 40 nm and 150 nm.

7. The magnetic recording-reproducing apparatus according to claim 5, wherein said cobalt alloy bias layer has a coercive force Hc not smaller than 160,000 A/m.

8. The magnetic recording-reproducing apparatus according to claim 5, wherein each of said cobalt alloy bias layer and said soft magnetic layer has a ratio Mr/Ms, i.e., a ratio of the residual magnetization Mr in the radial direction to the saturation magnetization Ms, of 0.97 or more.

* * * * *